No. 731,073. PATENTED JUNE 16, 1903.
C. G. RUST.
MACHINE FOR FEEDING CLAY OR OTHER MATERIAL TO BRICK,
TILE, OR OTHER MACHINES.
APPLICATION FILED JAN. 16, 1902.
NO MODEL.
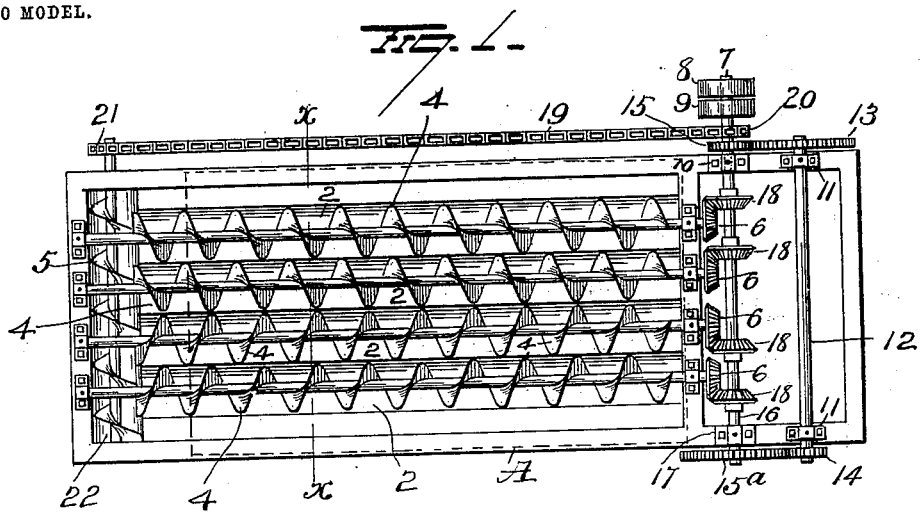
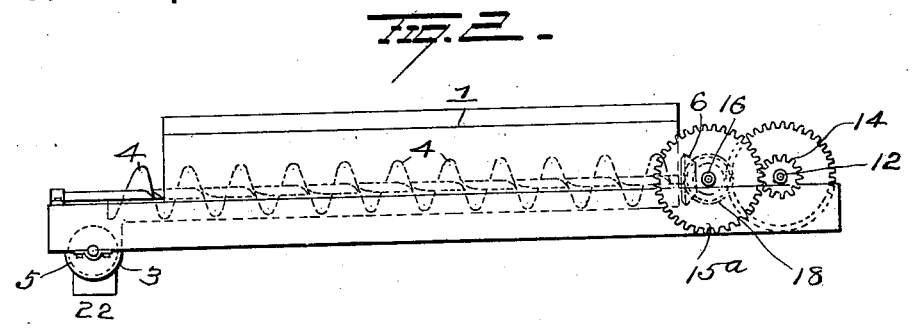
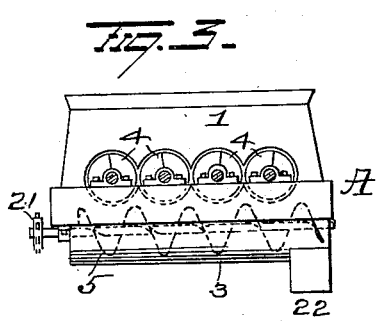
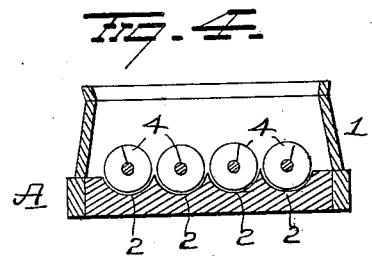
WITNESSES
INVENTOR No. 731,073. Patented June 16, 1903.

UNITED STATES PATENT OFFICE.

CLIFFORD G. RUST, OF HERBST, INDIANA.

MACHINE FOR FEEDING CLAY OR OTHER MATERIAL TO BRICK, TILE, OR OTHER MACHINES.

SPECIFICATION forming part of Letters Patent No. 731,073, dated June 16, 1903.

Application filed January 16, 1902. Serial No. 90,068. (No model.)

*To all whom it may concern:*

Be it known that I, CLIFFORD G. RUST, of Herbst, in the county of Grant and State of Indiana, have invented certain new and useful Improvements in Machines for Feeding Clay or other Material to Brick, Tile, or other Machines; and I do hereby declare the following to be a full, clear, and exact description of the invention, such as will enable others skilled in the art to which it appertains to make and use the same.

My invention relates to an improvement in machines for feeding clay or other material to brick, tile, or other machines, the object of the invention being to provide a device capable of being used in connection with brick and tile machines of varying types for feeding the clay thereto; and it consists in certain novel features of construction and combinations of parts, as will be hereinafter more fully described, and pointed out in the claim.

In the accompanying drawings, Figure 1 represents a plan view of my improvement, outline of the hopper being shown in dotted lines. Fig. 2 is a view in side elevation of same. Fig. 3 is a view in end elevation; and Fig. 4 is a view in transverse section, taken on the line $x\,x$ of Fig. 1.

A represents a table or platform, and 1 a hopper mounted thereon, both of which are preferably constructed of wood; but any other suitable material may be used in their construction, if desired. The table or platform A is provided with a series of longitudinal grooves or gutters 2, each of which is formed in the arc of a circle and extends from a point adjacent to the forward end of hopper 1 to and through the opposite end of table or platform, so as to discharge their contents into the trough 3, which is located adjacent to the discharge end of the table or platform and under and at right angles to the longitudinal grooves or gutters 2. These grooves or gutters are preferably in the same horizontal plane throughout their length and are each provided with a spiral conveyer 4, which latter are mounted to rotate in suitable bearings carried by the table or platform A, while the horizontally-disposed trough 3, which inclines downwardly toward its discharge end, is likewise provided with a spiral conveyer 5, mounted to rotate in bearings also carried by the said table or platform A. Each of the spiral conveyers 4 has keyed thereon a bevel-gear 6, while the projecting end of spiral conveyer 5 has keyed thereon a sprocket-wheel 21, through the medium of which gears and sprocket-wheel motion is transmitted to said spiral conveyers by the mechanism now to be described.

7 represents the driving-shaft, carrying a loose pulley 8 and a fixed pulley 9, one end of said shaft being mounted in a bearing 10, secured to table or platform A, while its opposite end (not shown) is supported in any convenient manner. This shaft 7 is located, preferably, in line with the driven shaft 16 and imparts motion thereto through the following-described gearing. Extending across table or platform A and mounted in bearings 11, secured thereon, is a counter-shaft 12, which carries at one end the large toothed wheel 13 and at its opposite end the small toothed wheel 14, the former meshing with the small toothed wheel 15, keyed to the driving-shaft 7 and from which it receives motion, while the small toothed wheel 14 meshes with the large toothed wheel $15^a$, keyed on the adjacent end of the driven shaft 16, which latter is mounted in the bearings 10 and 17. This driven shaft is parallel with counter-shaft 12 and also extends across platform or table A and is provided with a series of bevel or miter gears 18, adapted to mesh with and transmit motion to bevel or miter gears 6, keyed on the projecting ends of the spiral conveyers 4, as before described. Motion is transmitted to the horizontally-disposed spiral conveyer 5 by sprocket-chain 19, which latter passes over the sprocket-wheels 20 and 21, one of which being keyed on the projecting end of the spiral conveyer 5, while the other is keyed on shaft 7, between fixed pulley 9 and small toothed wheel 15.

By the arrangement of shafting, gears, &c., above described it will be seen that as soon as motion is applied to shaft 7 it is simultaneously transmitted therefrom to the longitudinally-arranged spiral conveyers through the medium of counter-shaft 12, driven shaft 16, and the attached gear-wheels and bevel or miter gears. It is also apparent that motion is immediately imparted to the horizontally-disposed spiral conveyer by means of the sprocket-wheels and connecting sprocket-chain referred to.

It will be obvious from the foregoing that as fast as the clay is dumped into the hopper, which, as shown in the drawings, is somewhat shorter than the table or platform A, so that the conveyers project at their discharge ends beyond same, it will be engaged and taken up by the parallel conveyers and discharged upon the horizontally-arranged spiral conveyer located in the trough depending from said platform or table, from whence it will be fed directly through a spout 22 into a brick, tile, or other machine to which the conveyer may be attached.

It is evident that changes in the construction and relative arrangement of parts might be made without avoiding my invention, and hence I would have it understood that I do not restrict myself to the particular construction and arrangement of parts shown and described; but, Having fully described my invention, what I claim as new, and desire to secure by Letters Patent, is—

In a machine for feeding clay, the combination with a table provided with a series of longitudinal grooves and with a transverse trough at one end, of a series of conveyers mounted on the table and disposed in the longitudinal grooves therein, a conveyer in the transverse trough, a driving-shaft, a sprocket-wheel on said driving-shaft, a sprocket-wheel on the shaft of the transverse conveyer, a chain passing over said sprocket-wheels, a counter-shaft, gearing between the counter-shaft and driving-shaft, a driven shaft, gearing between the driven shaft and the longitudinal conveyers, and gearing between the counter-shaft and the driven shaft.

In testimony whereof I have signed this specification in the presence of two subscribing witnesses.

CLIFFORD G. RUST.

Witnesses:
GRANT A. DENTLER,
MARSHALL WILLIAMS.